Nov. 19, 1940.  F. H. BATEMAN  2,222,015
METHOD OF AND MEANS FOR PLANTING
Filed Sept. 19, 1938 2 Sheets—Sheet 1
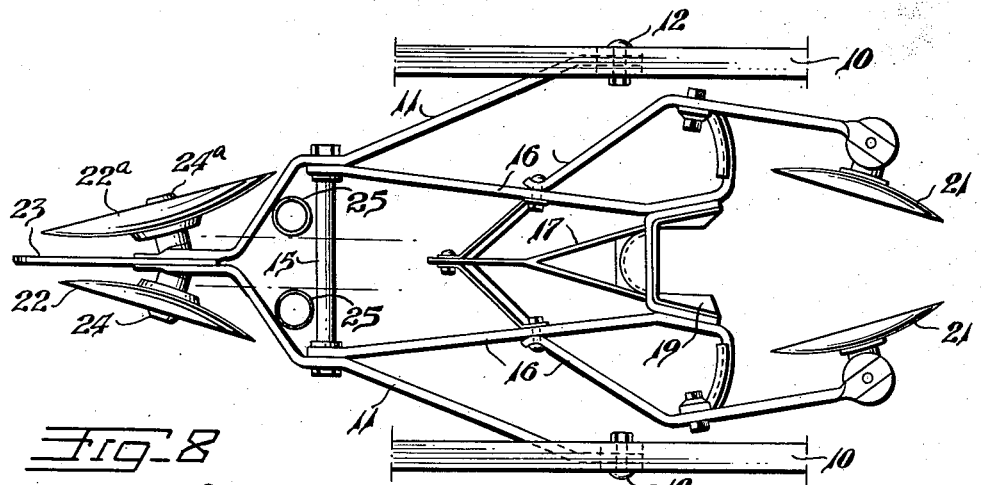
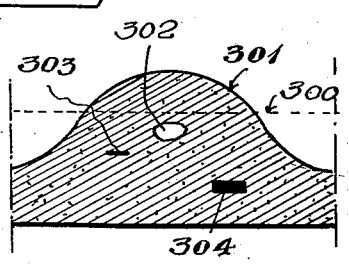
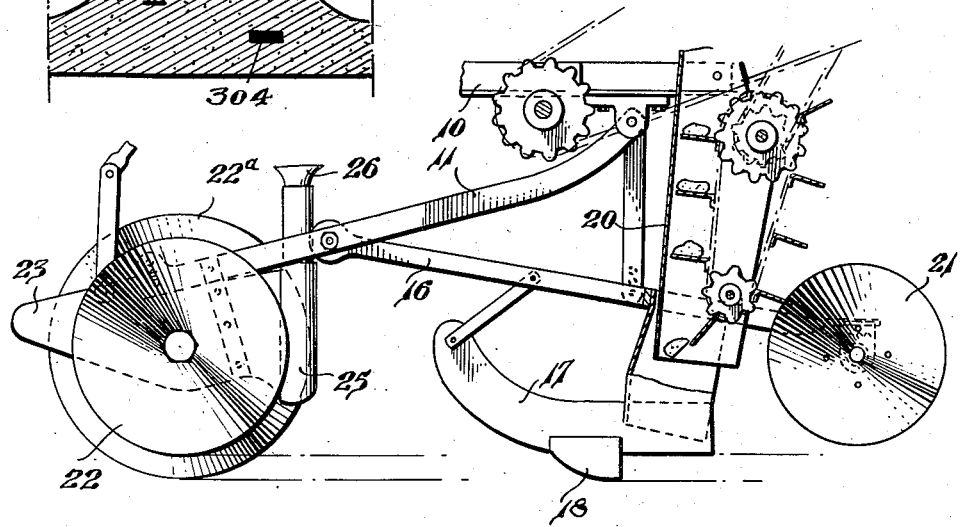
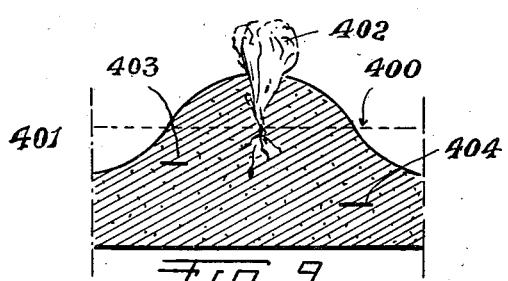
Inventor
FREDERIC H. BATEMAN
By Walter W. Burns
Attorney Nov. 19, 1940.    F. H. BATEMAN    2,222,015
METHOD OF AND MEANS FOR PLANTING
Filed Sept. 19, 1938    2 Sheets-Sheet 2
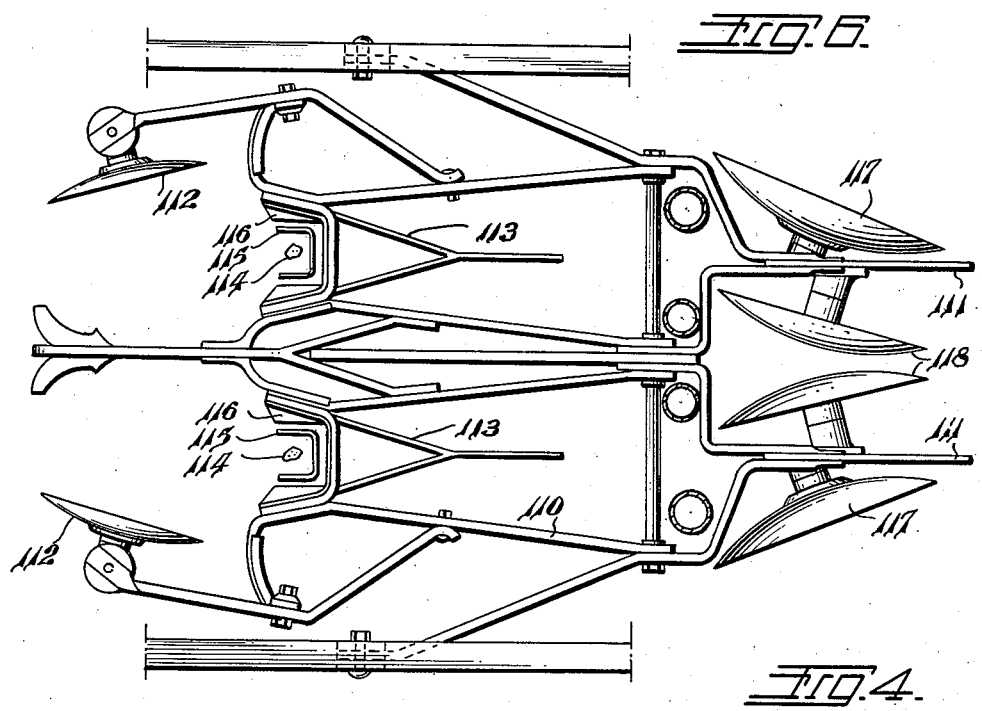
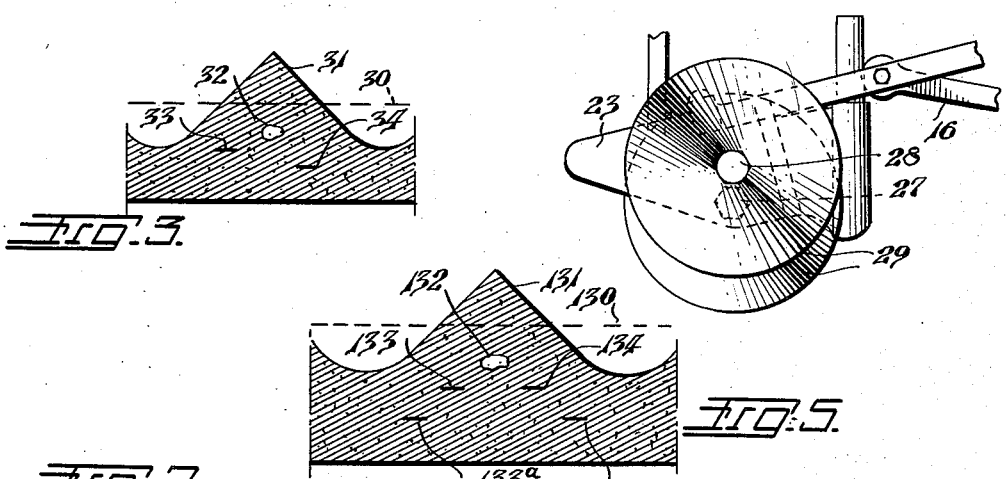
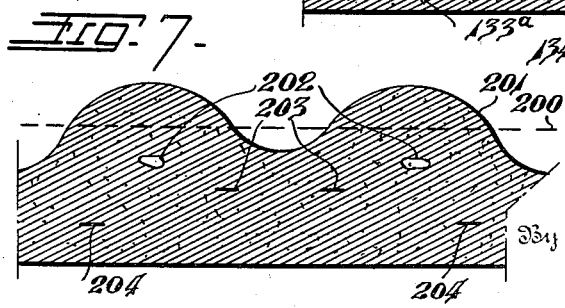
Inventor
FREDERIC H. BATEMAN
By Walter W. Burns
Attorney Patented Nov. 19, 1940

2,222,015

UNITED STATES PATENT OFFICE 2,222,015

METHOD OF AND MEANS FOR PLANTING

Frederic H. Bateman, Grenloch, N. J.

Application September 19, 1938, Serial No. 230,701

7 Claims. (Cl. 111—80)

This invention relates to planting and has particular bearing on the placing of the fertilizer in the ground in proper relation to the seeds or plants.

It has been generally recognized that the proper placing of fertilizer in the ground with relation to the planting of the seed or transplanted plants during planting, is of the greatest importance. Planting takes place at a time of year when the amount and frequency of rainfall which the plant will receive is unknown. For example, during a dry season and in climates where less moisture is received from rain, fertilizer may be placed more advantageously at a lower level since adequate moisture is essential to make the applied plant food available. However during a wet season and in climates where more moisture is received from rain, fertilizer may be placed advantageously at a higher level where it will be nearer the seed and become more quickly available for the use of the plant.

The present practice is to estimate the proper height of the fertilizer with relation to the transplantings or seed and also its proper distance therefrom to produce the best results in accordance with the probable amount of moisture to become available in the soil. It will readily be seen from this that with the present practice, a great deal depends upon the mere chance of having greater or less rain and the success of the plants will depend largely upon guess work.

In order to obviate these difficulties, I have evolved a method of planting wherein the matter of chance does not control the results obtained from the planting.

The primary object of this invention is the provision of an improved method of and means for planting seeds, and transplantings and the placing of fertilizer with relation thereto.

Another object of the invention is the provision of a method of planting and placing of fertilizer wherein, in different directions from the seed or transplanting, the fertilizer units are placed at different distances.

Still another object of the invention is the provision of a method of planting and placing of fertilizer wherein the fertilizer is placed so that it will be adjacent the seed and at varying heights relative thereto, and in which the fertilizer may be, though not necessarily, deposited in horizontal deposits.

A further object of the invention is the provision of a method of planting and placing of fertilizer wherein, different fertilizer units are placed at different levels on opposite sides of the seed or plant.

A still further object of the invention is the provision of a means for planting seed or transplantings and depositing fertilizer in units in different directions and at different distances from the seed or transplanting.

Another and still further object of the invention is the provision of a means for planting and depositing fertilizer in units at different distances from and at different levels relative to the position of the seed or transplanting.

Other and further objects of the invention will be apparent to those skilled in the art from a reading of the complete specification and claims.

Referring to the accompanying drawings where I have illustrated by invention:

Fig. 1 is a plan view of the under frame of a planter with one form of my invention attached thereto, parts being omitted and others sectioned for the sake of clearness.

Fig. 2 is an elevation of the frame shown in Fig. 1 with parts broken away and other parts added.

Fig. 3 is a diagrammatic cross section of a row showing the position of a seed and the positions of the bands of fertilizer in one form of practicing my invention.

Fig. 4 is a fragmental view of a modified form of the forward portion of the frame shown in Fig. 2 showing disks of the same size but with axes at different levels.

Fig. 5 is a diagrammatic showing of a cross section of a row of a modified form.

Fig. 6 is a plan view of the under frame of a twin-row planter with my invention attached, parts being omitted or shown in section for the sake of clearness.

Fig. 7 is a vertical cross section of a row showing the relative positions of seed and fertilizer units.

Fig. 8 represents a cross section of a potato row showing different amounts of fertilizer placed at different levels.

Fig. 9 illustrates a cross section of a row showing the fertilizer application after the plant has started to grow.

In carrying out my invention, I may use any suitable planter one of which is illustrated in the Patent No. 2,071,324 in which I am a joint inventor. In this planter which I have selected to illustrate my invention, I have provided means for planting seed potatoes in the ground. It will be understood, however, that the invention is not limited to potato planting or even to seed planting.

Throughout the drawings and specification similar reference characters refer to the same or similar parts.

One means for carrying out my invention is shown in Figs. 1 and 2 wherein is illustrated my invention applied to the underframe of a potato planter shown in Patent No. 2,053,390 wherein I am a joint inventor.

The numeral 10 designates the main frame of the planter to which the under frame members 11 are pivoted at 12. On the forward portions of the frame members 11 is located a shaft member 15 to which is pivoted the planter frame 16. On this frame 16 is mounted a shoe 17 which carries a grooving shoe 18 and is provided with wings 19. Serving as a guide to carry the potato seeds to their positions in the ground, is the spout 20, the lower end of which extends to a point near the ground and above the space between the two wings.

At the rear of the spout 20 and mounted on the rear end of the planting frame 16 are the closing disks 21.

As the operation of the foregoing construction is well known in the art, further detailed description will not be made.

Mounted on the forward portion of the frame member 11, I place my improved earth removing means which permit depositing of the fertilizer in the manner of my invention. Any suitable means, which would remove the earth to different levels or depths or at different distances from the line in which the seeds or plants are to be placed, may be used. In the illustrated form, I provide two opening disks 22, 22ª, the latter of which is shown as having a greater diameter than the former. The operation of these earth removing means must be such as to enter the earth to different depths.

In Figs. 1 and 2, 23 designates a shield or plate which is secured to the forward ends of the under frame members 11. Two spindles 24 and 24ª are secured to the shield and in this form are shown at the same level. To bring about the removal of earth at two levels for the deposit of fertilizer at these levels, I provide the disks 22 and 22ª of different sizes, for example, the disk 22ª may be greater in diameter by four inches making a difference of two inches between the depths, to which the disks will enter the ground.

Immediately to the rear of each disk 22, 22ª is a boot 25 which receives fertilizer from a suitable hopper (not shown). The boots 25 deliver the fertilizer to the bottoms of the furrows made by the respective disks 22, 22ª.

In Fig. 4, I have illustrated a modified form wherein spindles 27, 28 are attached to the shield 23 at different levels. In this case, the disks 29 may be, as illustrated, of the same size. Since the lower edges of the disks 29 occupy similar positions in the ground, corresponding to the respective disks 22, 22ª, it will be clear that the same result is accomplished whether the spindles are at the same level and the disks of different size or spindles at different heights are used to support disks of the same size.

As has already been stated, the sizes of the disks and the positions at which their spindles are mounted, control the depths to which the fertilizer will be placed. The position of the shield 23 and the disks 22, 22ª, relative to the shoes 17 and 18, and the line of travel will determine the position of deposit of the fertilizer units. The fertilizer units as herein described are continuous dry horizontal bands. However, the particular type or method of application of fertilizer used, whether liquid or dry, horizontal or non-horizontal, in continuous or interrupted bands or spot deposits, is not the important feature of this invention, since any type of fertilizer may be used and the benefit of the invention may be received as long as the proper heights and distances from the seed is effected. It is to be understood further that different relative heights and distances would be used depending upon the particular seeds or plants and fertilizer used and also upon the climatic conditions to be encountered.

In Fig. 5, I have illustrated a modified form of the results of the operation. In this form, 130 designates the normal ground line, 131 the surface of the ground after planting and 132 the position of the potato seed. The fertilizer is placed on opposite sides, there being two units deposited on one side at different levels as at 133 and 133ª while on the other side are two additional units as at 134 and 134ª. There are many other ways in which the seed and fertilizer units could be placed depending upon the details of the problem presented. From a reading of the foregoing, it will be clear that the arrangement of the required number of disks in the necessary positions to produce the desired results would be varied with the conditions presented. However, once the proper arrangements are determined, the variations in rainfall will not produce the disastrous results which are frequent from this cause.

This invention may also be applied to the structure illustrated in the Patent No. 2,071,324 wherein I am a joint inventor. With this structure, the under frame of which I have illustrated on Fig. 6, a double row of plantings is made at the same time and the structure described therein is adapted for planting potatoes.

The under frame 110 has two forwardly extending shields 111 and at its rear are two closing disks 112.

A shoe 113 opens the furrow for the planting of the seed 114 which is deposited in the furrow downwardly through the tube 115 within the boot 116.

At the forward end of the frame are four disks, arranged in this form, in pairs, the outer disks 117 being of larger diameter than the inner disks 118. These disks 117, 118, in the form illustrated, are mounted on the shields 111, with their axes at the same level, although this is not necessary.

As in the case of the plantings described in the Patent No. 2,071,324, the two rows of seeds will each have two units of fertilizer—one on each side. In the present form of the invention, however, the right hand fertilizer unit for the right row of plantings and the left hand unit for the left row of plantings will be placed lower than the two units therebetween, the difference in level being determined by the relative heights of the bearings upon which the disks are mounted.

In Fig. 7, I illustrate a planted row in cross section as the row may be made by the twin row machine just previously mentioned. In this figure, 200 represents the normal ground line, 201 the ground line after planting. Each seed 202 has a unit 203 of fertilizer deposited at a level which is higher relative to another unit 204. The furrows for depositing of the fertilizer units 203 were made by the disks 118 and the fertilizer units 204 were deposited in the furrows made by the disks 117. The operation of the disks 117, 118 is the same as already described for the single row planter, as far as the results are concerned. However, in the twin-row planter here described, two of the furrows are turned to the right and two to the left as will be clear from Fig. 6.

My invention is adapted for use with different types of fertilizer and also with different component parts of the fertilizer in separate units. For example, units of phosphates and nitrates may be placed as at 133 and 134, respectively as shown in Fig. 5 while the potash component may be placed at lower levels as at 133ª, 134ª. Another variation may be made by using one of the usual or any desirable compounds and placing any desired percentage of the deposit at separate levels. Or different mixed fertilizers may be deposited at different heights.

While the present day methods of planting fertilizer have been a great improvement over older methods, my improved method further removes the danger of fertilizer injuring the seeds and plants. This is particularly true where it is found to be desirable to make large applications of fertilizer.

When the season is dry, the roots will extend down to the moisture available at the greater depths. At the greater depth, the roots will have the advantage of the fertilizer in the presence of the moisture there available and even though the top soil should be dry, the growth will go on stimulated by the low level moisture and fertilizer as aforesaid.

When fertilizer is placed in the ground near the surface and allowed to dry before it is taken up by the plant, a chemical change takes place called fixation, which partially or wholly destroys the growth-promoting properties of the fertilizer. By placing some of the fertilizer at a lower level, fixation of the fertilizer at the lower level where the soil is moist, is prevented while the roots of the plant are reaching down to the fertilizer.

Where planting is in poor soil, the seed or plant needs an early supply of fertilizer. Consequently, the top unit of fertilizer which is placed nearer the seed or plant, supplies this early need.

In Fig. 8, I have illustrated a cross section of a row wherein a small amount of fertilizer is placed near and at one side of the planting and a relatively large amount at a lower depth. These fertilizer units may be placed in vertical planes which are equi-distant from the planting or of an unequal distance. For example, in Fig. 8, the line 300 represents the normal ground level and 301 represents the surface of the ground after the planting has taken place. The planting is represented by the numeral 302 and the fertilizer at the higher elevation by the numeral 303. At the lower level is the fertilizer unit 304. In practice, the fertilizer unit 303 may represent 25% of the total amount deposited while the unit 304 at the lower level may represent, for example, 75% of the total amount of fertilizer placed in the row. The distance from the planting in a horizontal direction and in a vertical direction may be varied to suit the particular soil, season and other conditions.

In Fig. 9, I have illustrated a cross section of a row wherein the normal ground level is represented at 400, the ground level after planting at 401 and the planting at 402. Fertilizer units may be deposited after the plant has started as at 403 and 404. These deferred applications of fertilizer placed at different levels operate on the planting 402 in a similar manner to the plantings previously described.

Placing the fertilizer at a plurality of depths, insures a more certain supply of plant food, regardless of soil and climatic conditions. In addition, this plurality of depth method reduces the liability of loss of fertilizer due to erosion of the ground surface, the fertilizer at the lower depth being lower than the usual action of the water in washing or eroding away the surface of the field.

As previously mentioned, variations in the amount of fertilizer at the different depths may have advantages. For example, with 25% of the fertilizer at the higher level and 75% at a lower level as shown in Figs. 3, 5, 7, 8, or 9, the young roots would be given an early start by the fertilizer unit at the higher level. As the roots reach the lower level, the plant will be ready for the greater amount of plant food in the fertilizer at the lower depth where a greater amount of moisture is present. In addition, the larger amount of the fertilizer is protected against surface erosion by its greater depth below the surface.

It may be here stated that this process does not necessarily have to have all steps performed absolutely simultaneously. For example, the fertilizer and planting may be deposited by the same machine in one operation or the two operations may be performed by separate machines which may or may not be hauled simultaneously by the same machine. In some instances it may be advantageous to place the fertilizer units before the placing of the plantings and in some instances it may be desirable to place the fertilizer after the plantings are in place.

Since the method of planting seeds and transplantings is the same as far as the operation of my invention is concerned, I have referred to the seeds and the roots of the transplantings, which are covered with earth, simply as plantings.

While I have described and illustrated in detail the carrying out of my invention, it is desired that it be understood that I do not limit myself to any particular plant or seeds nor to the placing of any particular number of the fertilizer units at any particular relative height to each other or to the seed or plant or any particular distance or direction from the seed or plant or to liquid or dry fertilizer or to fertilizer placed in horizontal, continuous, interrupted, or spot deposits, nor to any particular relative amounts in the different units nor to the placing of the plantings and fertilizer in the ground in any particular sequence or time relation and that modifications and changes may be made without departing from the spirit of the invention and within its scope as claimed.

Having described my invention, what I claim is:

1. The method of planting which comprises the depositing of plantings and fertilizer in rows of units, the rows being spaced from each other, the fertilizer units of different rows being placed at different levels, relative to the positions of the plantings, and covering the fertilizer and plantings with earth.

2. The method of planting which comprises the depositing of plantings and fertilizer in rows of units, the rows being spaced from each other, the fertilizer units of different rows being placed on opposite sides of the positions of the individual plantings at different levels, and covering the plantings and fertilizer with earth.

3. The method of planting which comprises the depositing of plantings and fertilizer in rows of units, the rows being spaced from each other, the fertilizer units of different rows being placed in separate deposits, these deposits being at different distances from the positions of the plantings, and covering the fertilizer and plantings with earth.

4. In a planter, an earth opening member, a planting guide for guiding plantings to their positions behind the earth opening member, earth removing means comprising two disks located on opposite sides of the line of travel of the earth opening member, the disks being pivoted at substantially the same level and being of unequal diameters and having their lower edges at different levels, and fertilizer guiding elements for delivering fertilizer to different levels to which the earth has been removed.

5. The method of planting which comprises the depositing of plantings and fertilizer units in separate rows, the units of different rows being placed at different levels, and containing different predetermined amounts.

6. The method of planting which comprises the depositing of plantings and fertilizer units in separate rows, the separate units of different rows being placed at different levels, a lower level unit containing a greater amount of fertilizer than a higher unit.

7. The method of planting which comprises the depositing of plantings and fertilizer units in separate rows, the units of different rows being placed at different levels, one component part of the fertilizer being placed in a higher unit, and another component part being placed in a relatively lower unit.

FREDERIC H. BATEMAN.